United States Patent
Khusid et al.

[15] 3,664,999
[45] May 23, 1972

[54] METHOD FOR PRODUCTION OF CELLULOSE ION EXCHANGERS

[72] Inventors: Iosif Efimovich Khusid, Riga Latviiskoi; Ljudmila Ivanovna Bezgodova; Mara Khugovna Ruben, both of Olaine Latviiskoi, all of U.S.S.R.

[73] Assignee: Olainsky Zavod Khimreaktivov, Latviiskaya, S.S.R. Olaine, U.S.S.R.

[22] Filed: Apr. 22, 1968

[21] Appl. No.: 723,260

[30] Foreign Application Priority Data

Apr. 22, 1967 U.S.S.R..............................1,150,438

[52] U.S. Cl......................260/231 A, 260/231 R, 260/232, 260/233
[51] Int. Cl.........................................................C08b 11/00
[58] Field of Search..................260/231 A, 232, 233, 233.3

[56] References Cited

UNITED STATES PATENTS

| | | | |
|---|---|---|---|
| 2,667,480 | 1/1954 | Branan et al | 260/231 |
| 2,876,217 | 3/1959 | Paschall | 260/233.3 |
| 2,917,506 | 12/1959 | Caldwell et al. | 260/234 |
| 2,921,934 | 1/1960 | Weisberg | 260/232 |
| 3,070,594 | 12/1962 | Harris et al. | 260/233.3 |
| 3,226,380 | 12/1965 | Knight | 260/212 |
| 3,243,426 | 3/1966 | Caesar | 260/233.3 |
| 3,342,805 | 9/1967 | Calihan | 260/232 |
| 3,379,719 | 4/1968 | Rulison | 260/231 |
| 3,394,127 | 7/1968 | Sommers | 260/232 |

OTHER PUBLICATIONS

Peterson et al., American Chemical Society Journal, Vol. 78, Feb. 1956, pages 751 through 755.

*Primary Examiner*—Donald E. Czaja
*Assistant Examiner*—M. I. Marquis
*Attorney*—Waters, Roditi & Schwartz

[57] ABSTRACT

A method for the manufacture of cellulose ion exchangers, such as carboxymethylcellulose, diethylaminoethylcellulose, and ECTEOLA-cellulose, by treating moist disintegrated cellulose with sodium hydroxide solution, etherifying the thus-mercerized cellulose, at an elevated temperature, and thereafter washing the product and dehydrating same with an organic solvent.

5 Claims, No Drawings

METHOD FOR PRODUCTION OF CELLULOSE ION EXCHANGERS

This invention relates to methods for the production of cellulose ion exchangers such as carboxymethylcellulose, diethylaminoethylcellulose, and ECTEOLA-cellulose, which find application in biological research, in the pharmaceutical industry, and in other industrial fields.

There is a known method for the preparation of cellulose ion-exchange adsorbents, which comprises treating dry cellulose powder with a concentrated sodium hydroxide solution at a temperature of 4–6° C. (mercerization), followed by etherification with appropriate agents, and washing, dehydrating and drying the obtained product.

The known method suffers from the following limitations.

The mercerization step involves technological difficulties, particularly so at the commencement of the mercerization process when small quantities of alkali solution at a temperature of 4–6° C. are added to the bulk of dry cellulose powder and yield a non-homogeneous, locally almost solidified, mass which does not lend itself to stirring and tends to be locally overheated due to poor heat transfer.

The manufacturing process is very elaborate and expensive, insofar as it calls for the use of dry cellulose powder as feed stock which, prior to mercerization, is dehydrated by means of alcohol and ether, dried and sieved, and thereafter mercerized by treating with aqueous alkali.

The process equipment and flow sheet are complicated, inasmuch as the process of mercerization is carried out at a temperature of 4–6° C. and the reaction mixture, after completion of the etherification step, must be cooled down to 4°–6° C.

The employment of diethyl ether or acetone for dehydrating the precipitate of cellulose ion exchangers involves fire and explosion hazards.

It is an object of the present invention to simplify the process of manufacturing cellulose ion exchangers, to increase the yield of product compounds, and to provide for an enhanced efficiency of raw material utilization.

These objects are accomplished by the provision of a method for the production of cellulose ion exchangers which comprises treating cellulose with a sodium hydroxide solution, carrying out the etherification step at an elevated temperature, followed by cooling and washing the product thus obtained and dehydrating it by means of organic solvent, the novel feature of the method, according to the invention, being that the cellulose material subjected to alkaline treatment consists of disintegrated cellulose having a moisture content of not greater than 70 percent by weight and a pH equal to or greater than 7.

It is preferable to use cellulose pulp having a moisture content of 60 to 70 percent by weight, thereby making it possible to obtain a more mobile homogeneous pulp and to carry out the mercerization step more completely and within a shorter time at a temperature of 6° to 12° C.

After the etherification step, the reaction product is cooled to 30° C. prior to its being subjected to further treatment.

To obtain the desired cellulose ion exchanger, use is made of an appropriate etherifying agent. For example, carboxymethyl-cellulose can be prepared by using a solution of monochloroacetic acid to effect cellulose etherification, while the use of a solution of 2-chlorotriethylamine hydrochloride yields diethylaminoethylcellulose. A mixture of epichlorohydrin and triethanolamine is useful for the preparation of ECTEOLA-cellulose.

Cellulose ion exchangers can be prepared according to the present invention not only from dry cellulose powder, but also by using aqueous cellulose paste obtained after washing the cellulose stock from which dry cellulose powder is to be produced, the employment of aqueous cellulose paste being advantageous inasmuch as it is conducive to reducing substantially the cost price of the finished product.

The present invention makes it possible to simplify the process of cellulose mercerization as a result of the fact that the incorporation of aqueous alkali into cellulose in the form of an aqueous paste yields an adequately mobile mass, so that the mercerization process proceeds under milder conditions, at a greater rate and more completely than is practicable when resorting to the known method, the overall result being that the yields of product compounds are higher than those obtainable with dry cellulose powder as the starting material.

Carrying out the mercerization process at a temperature of 6°–12° C., as against a temperature of 4°–6° C., and cooling the reaction mixture down to a temperature of 20°–30° C., as against a temperature of 4°–6° C. resorted to in the known method, renders possible the use of simpler equipment for cooling the reaction mixture, yields a saving in time and involves lower power consumption.

For a better understanding of the invention, the following examples are presented by way of illustration.

EXAMPLE 1.

One hundred grams of aqueous cellulose paste (on dry weight basis) obtained in the course of manufacturing dry cellulose powder is placed in a 3-l. reactor and into it is stirred 330 ml of a 31 percent aqueous solution of NaOH at a temperature of 6°–12° C. The contents of the reactor are maintained at this temperature for 30 minutes, followed by incorporating thereinto 67 ml. of 43 percent monochloroacetic acid and carrying out the etherification process at a temperature of 70° to 75° C. for a period of 20 minutes.

Then, the reaction mixture is cooled to 30° C. and into it is stirred 850 ml of 10 percent acetic acid followed by acidulation with glacial acetic acid until the pH equals 4 to 5. NaOH.

The reaction mixture is filtered, and the carboxymethylcellulose thus separated is washed with distilled water until the washings show no acidic reaction and thereafter placed in 2 l of 0.5N HCl for a period of 3 hours, washed again with water until the washings show no acidic reaction, dehydrated with 800 ml of absolute ethanol and dried in the air. The yield of carboxymethylcellulose equals 69 g; exchange capacity, 0.5 meq per gram.

EXAMPLE 2.

One hundred grams of cellulose powder (on dry weight basis) is diluted with water until the moisture content equals 70 percent and placed in a 3-l reactor and treated, while being stirred, with 250 ml of 20% NaOH at a temperature of 6°–12° C. The reaction mixture is maintained at this temperature for 30 minutes and thereafter etherified at a temperature of 80°–85° C. and for a period of 35 minutes with 175 ml. of a 25 percent solution of 2-chlorotriethylamine hydrochloride. Then, the reaction mixture is cooled to 20°–30° C., 400 ml of 2N NaCl solution is added thereto and the precipitate is filtered off. The filter cake is washed with 1N NaOH to remove any color, and thereafter with 300 ml of 1N HCl and 300 ml of 1N NaOH, transferred into a beaker into which is charged 2.5l. of 0.1 N NaOH and left for 10 hours. The supernatant liquid is decanted and the precipitate of diethylaminoethylcellulose is filtered off, washed with water until the washings show no basic reaction, dehydrated with 800 ml of absolute alcohol and dried in the air.

The yield of diethylaminoethylcellulose is 63 g; exchange capacity, 0.6 meq per gram.

EXAMPLE 3.

One hundred grams of dry cellulose powder (on dry weight basis) is diluted with water until the moisture content equals 70 percent by weight, and the resultant aqueous paste is charged in a 5-l reactor.

Then, 250 ml of 28% NaOH solution is stirred into the paste at a temperature of 6°–12° C. and the reaction mixture is allowed to stand for 20 to 30 minutes, followed by adding thereinto 690 ml of a mixture of triethanolamine and epichlorohydrin taken in a ratio of 1.3:1.0. The contents of the reactor are heated on a water bath, maintained at a temperature of 90°–105° C. for 30 minutes, cooled to 30° C., and 400 ml of 2N NaOH solution is added thereto. The precipitate of ECTEOLA-cellulose is separated, placed in a 1N solution of NaOH for 1 hour and filtered off, followed by washing the filter cake first with 300 ml of 1N HCl and then with 300 ml of 1N NaOH. This washing procedure is repeated and thereafter 2.5 l. of 0.1N NaOH is poured onto the precipitate and left for 10 hours. The liquid is decanted and the ECTEOLA-cellulose precipitate is washed with distilled water until washings show neutral reaction, dehydrated with 800 ml. of absolute ethanol and dried in the air. The yield of ECTEOLA-cellulose equals 89 g.; exchange capacity, 0.55 meq per gram.

We claim:

1. A method for the production of cellulose ion exchangers which comprises mercerizing disintegrated cellulose having a moisture content of between 60 and 70 percent by weight with a solution of sodium hydroxide at a temperature of not below 6° C. and a pH of at least 7 in the reaction mixture, followed by etherifying the mercerized product with monochloracetic acid, 2-chlorotriethylamine hydrochloride, or epichlorohydrin and triethanolamine, and thereafter washing, dehydrating with and organic solvent and drying the cellulose ethers thus obtained.

2. A method according to claim 1, wherein mercerizing is carried out at a temperature of 6°–12° C.

3. A method according to claim 1, wherein the etherification is effected at a temperature of 70°–75° C. with a solution of monochloroacetic acid to produce carboxymethylcellulose.

4. A method according to claim 1, wherein the etherification is effected at a temperature of 80°–85° C. with a solution of 2-chlorotriethylamine hydrochloride to produce diethylaminoethylcellulose.

5. A method according to claim 1, wherein mercerized disintegrated cellulose is etherified with a mixture of triethanolamine and epichlorohydrin at a temperature of from 90° to 105° C. to obtain a mixed cellulose ether.

* * * * *